US010240697B2

United States Patent
Wang et al.

(10) Patent No.: US 10,240,697 B2
(45) Date of Patent: Mar. 26, 2019

(54) FRACTURING LIQUID DELIVERY HOSE FOR RECOVERY OF SHALE OIL AND GAS, AND MANUFACTURING METHOD THEREOF

(71) Applicant: 5Elem Material Scientific(Jiangsu) Co., Ltd, Taizhou (CN)

(72) Inventors: Jinma Wang, Taizhou (CN); Donghui Wang, Taizhou (CN); Shanhong Zhou, Taizhou (CN)

(73) Assignee: 5elem Material Scientific(Jiangsu) Co., LTD., Jiangsu (CN)

( * ) Notice: Subject to any disclaimer, the term of this patent is extended or adjusted under 35 U.S.C. 154(b) by 0 days.

(21) Appl. No.: 14/418,222

(22) PCT Filed: Aug. 22, 2014

(86) PCT No.: PCT/CN2014/085019
§ 371 (c)(1),
(2) Date: Jan. 29, 2015

(87) PCT Pub. No.: WO2016/026141
PCT Pub. Date: Feb. 25, 2016

(65) Prior Publication Data
US 2017/0159850 A1 Jun. 8, 2017

(51) Int. Cl.
*F16L 11/08* (2006.01)
*B29C 47/00* (2006.01)
(Continued)

(52) U.S. Cl.
CPC ........ *F16L 11/085* (2013.01); *B29C 47/0026* (2013.01); *B29C 47/0064* (2013.01);
(Continued)

(58) Field of Classification Search
CPC .............. F16L 11/085; B29C 47/0026; B29C 47/0064; B29C 47/065; B29C 65/10;
(Continued)

(56) References Cited

U.S. PATENT DOCUMENTS 2,828,537 A 4/1958 Johannes et al.
2,924,245 A 2/1960 Wilson
(Continued)

FOREIGN PATENT DOCUMENTS

CN 101275691 A 10/2008
CN 101370648 B 2/2009
(Continued)

OTHER PUBLICATIONS

Huntsman, "A Guide to Thermoplastic Polyurethanes (TPU)", 2010: Online at http://www.huntsman.com/polyurethanes/Media%20Library/global/files/guide_tpu_screen.pdf. Retrieved on Jan. 16, 2015. (26 pages).
(Continued)

*Primary Examiner* — Craig Schneider
*Assistant Examiner* — David Deal
(74) *Attorney, Agent, or Firm* — Buchanan Ingersoll & Rooney PC

(57) ABSTRACT

The present invention provides a multi-layer hose comprising a cover layer, comprising a first polymer, an enhancement layer comprising woven filaments, and an inner lining, comprising a second polymer, wherein the first polymer and the second polymer are dissimilar. The first polymer is preferably a polymer with good wear resistance properties, e.g., thermoplastic polyurethane (TPU), TPU/PVC, or PVC, or PVC/NBR. The second polymer is preferably a polymer with good chemical resistance properties, e.g., ethylene
(Continued)

propylene diene monomer (EPDM) rubber. The present invention also provides a method of manufacturing said multi-layer hose.

8 Claims, 3 Drawing Sheets

(51) Int. Cl.
| | |
|---|---|
| B29C 47/06 | (2006.01) |
| B29C 65/10 | (2006.01) |
| B29C 65/48 | (2006.01) |
| B29C 65/52 | (2006.01) |
| B29C 65/00 | (2006.01) |
| B32B 5/02 | (2006.01) |
| B32B 7/12 | (2006.01) |
| B32B 25/10 | (2006.01) |
| E21B 17/20 | (2006.01) |
| F16L 11/127 | (2006.01) |
| B29K 23/00 | (2006.01) |
| B29K 75/00 | (2006.01) |
| B29K 77/00 | (2006.01) |
| E21B 43/26 | (2006.01) |

(52) U.S. Cl.
CPC ............ *B29C 47/065* (2013.01); *B29C 65/10* (2013.01); *B29C 65/4815* (2013.01); *B29C 65/525* (2013.01); *B29C 66/5221* (2013.01); *B29C 66/712* (2013.01); *B32B 5/024* (2013.01); *B32B 7/12* (2013.01); *B32B 25/10* (2013.01); *E21B 17/20* (2013.01); *F16L 11/127* (2013.01); *B29K 2023/16* (2013.01); *B29K 2075/00* (2013.01); *B29K 2077/00* (2013.01); *B32B 2262/0261* (2013.01); *B32B 2274/00* (2013.01); *B32B 2597/00* (2013.01); *E21B 43/26* (2013.01)

(58) Field of Classification Search
CPC .............. B29C 65/4815; B29C 65/525; B29C 66/5221; B32B 5/024; B32B 7/12; B32B 25/10; F21B 17/20; E21B 17/20; B29K 2023/16; B29K 2075/00
USPC ....... 138/126, 125, 124, 123, 137, 140, 141, 138/153
See application file for complete search history.

(56) References Cited

U.S. PATENT DOCUMENTS

| | | | |
|---|---|---|---|
| 3,693,665 A | 9/1972 | Veerling et al. | |
| 3,790,419 A * | 2/1974 | Atwell | F16L 11/112 138/130 |
| 4,442,154 A | 4/1984 | Fortsch et al. | |
| 4,470,188 A | 9/1984 | Holbrook et al. | |
| 4,576,205 A | 3/1986 | Morinaga et al. | |
| 4,723,579 A | 2/1988 | Hyodo et al. | |
| 4,945,016 A | 7/1990 | Murachi | |
| 5,047,200 A | 9/1991 | Harcourt | |
| 5,077,108 A * | 12/1991 | Ozawa | B32B 25/10 428/36.2 |
| 5,264,162 A | 11/1993 | Salem | |
| 5,445,191 A * | 8/1995 | Green | F16L 11/086 138/124 |
| 5,474,823 A | 12/1995 | Kamiyama | |
| 5,672,398 A | 9/1997 | Johnson | |
| 5,749,985 A | 5/1998 | Sparks et al. | |
| 5,765,597 A * | 6/1998 | Kiest, Jr. | B29C 63/36 138/97 |
| 5,816,293 A * | 10/1998 | Kiest, Jr. | B29C 63/0095 138/98 |
| 5,827,393 A | 10/1998 | Kinzelmann | |
| 6,170,531 B1 | 1/2001 | Jung et al. | |
| 6,179,008 B1 * | 1/2001 | Kawazura | B29C 47/023 138/125 |
| 6,230,749 B1 | 5/2001 | Kertesz | |
| 6,422,269 B1 | 7/2002 | Johansson et al. | |
| 6,482,878 B1 | 11/2002 | Chu | |
| 6,588,456 B2 | 7/2003 | Jeong | |
| 6,607,828 B1 | 8/2003 | Hasaka | |
| 6,774,172 B1 | 8/2004 | Nakamura | |
| 8,066,499 B2 | 11/2011 | Driver et al. | |
| 8,590,575 B2 | 11/2013 | D'Hulster | |
| 2002/0112770 A1 * | 8/2002 | Fisher | F16L 11/088 138/137 |
| 2003/0234057 A1 | 12/2003 | Woolstencroft et al. | |
| 2004/0045617 A1 | 3/2004 | Kamiyama et al. | |
| 2008/0053551 A1 * | 3/2008 | Hatchett | F16L 11/08 138/125 |
| 2009/0320952 A1 * | 12/2009 | Amma | B32B 1/08 138/126 |
| 2011/0088804 A1 | 4/2011 | Shinoda | |
| 2012/0042980 A1 * | 2/2012 | Mezzalira | B32B 1/08 138/137 |
| 2013/0000767 A1 * | 1/2013 | Nonaka | B29C 70/026 138/106 |
| 2013/0078472 A1 * | 3/2013 | Higashika | F16L 11/04 428/421 |
| 2014/0124080 A1 * | 5/2014 | Hellfeier | B32B 5/026 138/137 |
| 2014/0182734 A1 * | 7/2014 | Sarkar | B66B 3/002 138/137 |

FOREIGN PATENT DOCUMENTS

| | | |
|---|---|---|
| GB | 1569675 A | 6/1980 |
| GB | 2125459 A | 3/1984 |
| JP | 2002160295 A | 6/2002 |
| JP | 5176988 B2 | 4/2013 |
| WO | 97478681 A3 | 10/1998 |
| WO | 2013121854 A1 | 8/2013 |

OTHER PUBLICATIONS

Chang, Karl K., Aramid Fibers, ASM International Handbook, vol. 21, p. 41, 2003.
Robert Shanks and Ing Kong (2012). Thermoplastic Elastomers, Thermoplastic Elastomers, Prof. Adel El-Sonbati (Ed.), ISBN: 978-953-51-0346-2, InTech, DOI: 10.5772/36807. Available from: http://www.intechopen.com/books/thermoplastic-elastomers/thermoplastic-elastomers.
Saturated Water Vapor Pressure at Different Temperatures ; http://www.hxu.edu.cn/partwebs/huaxuexi/qt/hxsj/; .cutable9-2-htm; retrieved on Jul. 31, 2014.
Ethylene-Propylene Rubbers & Elastomers; iisrp.com/WebPolymers/10EPDMSep11.pdf; Sep. 12, 2002.
The Loctite Design Guide for Bonding Rubbers and TPEs, vol. 2; 2005.
English abstract for CN101275691; published on Oct. 1, 2008 and retrieved on Jan. 26, 2015.
English abstract for CN101370648; published Feb. 18, 2009 and retrieved on Jan. 26, 2015.
English abstract for JP5176988; published on Apr. 3, 2013 and retrieved on Jan. 26, 2015.
English abstract for JP2002160295; published Jun. 4, 2002 and retrieved on Jan. 26, 2015.

* cited by examiner

FRACTURING LIQUID DELIVERY HOSE FOR RECOVERY OF SHALE OIL AND GAS, AND MANUFACTURING METHOD THEREOF

TECHNICAL FIELD

The present invention relates to a multi-layered hose for delivering fluid, particularly hydrofracturing liquid for recovery of shale oil and gas, and manufacturing methods, and falls within the field of fluid delivery equipment.

BACKGROUND

The hydrofracturing, or hydraulic fracturing, technology is the fracturing of rock by a pressurized liquid. It has become a preferred method for extracting and recovery of shale oil and gas, tight gas, tight oil, and coal seam gas. A high pressure liquid is filled in a wellbore and causes a terrain to fracture. A propping agent in the high pressure liquid allows a crack to be held open, and also serves as a quick penetration channel for oil-gas steering drilling.

The fracturing liquid used in the hydrofracturing method available for recovery of shale gas typically includes water, sand and chemical additives (e.g., salts and emulsifying agents). The fracturing liquid is typically made up of 99% or more water and sand. It usually requires a very large amount of fracturing liquid for the exploitation of shale gas. A typical shale gas wellbore may require about 4 to 5 million gallons (1 gallon corresponding to about 3.78 L) of the fracturing liquid.

Metal pipes are commonly used for long distance delivery (in the scale of about 10 miles) in recovery of shale oil and gas. Laying long distances of metal pipes is labor intensive and very difficult in complex terrains, such as slopes, ravines, and ponds. More importantly, couplings of metal pipes are susceptible to cracking and leaking, which poses a great risk of soil pollution caused by leaked fracturing liquid.

Flexible hoses that can withstand the rigors of commercial fracking operations are highly desirable.

The present invention provides flexible hoses that have high structural integrity, long service life and weather- and chemical-resistance, are resistant to flex-cracking and high pressure, can withstand high delivering rate of fracturing fluid, and are suitable for various terrain topographies. When not in service, it lays flat, and can be easily wound, taking up less space for storage and transportation.

BRIEF DESCRIPTION OF THE DRAWINGS

In the following description, the same numerical references refer to similar elements. The embodiments, geometrical configurations, materials mentioned and/or dimensions shown in the figures or described in the present description are preferred embodiments only, given solely for exemplification purposes.

DETAILED DESCRIPTION

In the following description, the same numerical references refer to similar elements. The embodiments, geometrical configurations, materials mentioned and/or dimensions shown in the figures or described in the present description are preferred embodiments only, given solely for exemplification purposes.

Figure 1:
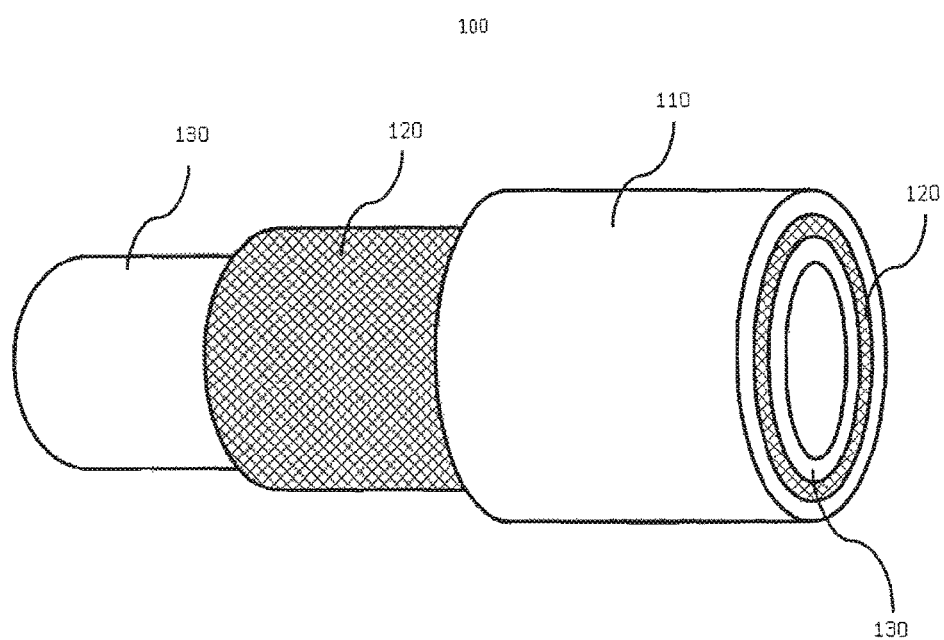
FIG. 1 is an illustration of one embodiment of the present invention multi-layer hose.

Referring to FIG. 1, there is shown a representation of the different layers comprised in the multi-layer hose, in accordance with one embodiment of the invention. As shown in FIG. 1, the multi-layer hose 100 according to an embodiment of the present invention comprises a cover layer 110, a woven enhancement layer 120, and an inner lining 130. The cover layer 110, enhancement layer 120, and inner lining are bonded together forming the multi-layer hose of the present invention. In alternative embodiments, additional layers may be provided without departing from the scope of the present invention.

In the above-described preferred embodiment, the cover layer 110 is made of a first polymer, preferably a polymer with good wear, abrasion, and weather resistance characteristics. Examples of suitable polymers for the cover layer are thermoplastic urethane material (TPU), polyvinyl chloride (PVC), TPU/PVC blends, or PVC/nitrile butadiene rubber (NBR) blends. The mass ratio for TPU/PVC blends is TPU:PVC=100:0-70. The mass ratio of PVC to powdered NBR is PVC:NBR=100:0-70, preferably 100:0-50. TPU is a lightweight material that offers great flexibility at low temperatures while providing excellent wear, abrasion, and weather resistance. However, as will be easily understood by one skilled in the art, other rubber or thermoplastic materials, or the like, could also be used in the manufacture of cover layer without departing from the scope of the present invention.

The cover layer 110 is formed into a tube, preferably by an extruding process. Preferably, the thickness of the out cover layer 110 will vary between 0.5-4.0 mm, but could also be thicker or thinner. Also, the out cover layer 110 has a surface that is capable of bonding to the woven enhancement layer 120 by use of moderate heat. In certain embodiments, a first adhesive layer (not shown) is applied to one surface of the tubular cover layer 110, which is bonded to the enhancement layer 120. The first adhesive layer typically has a thickness of 0.10-0.35 mm, but could also be thicker or thinner.

The enhancement layer 120 is woven on a loom using warp threads running longitudinally with respect to the enhancement layer 120 and the weft threads running helically along the enhancement layer 120. The enhancement layer 120 may be woven with terylene filaments or nylon or aramid fibers, or any other suitable fiber known to one skilled in the art, including but not limiting to vinyon fiber, polyethylene or polypropylene fibers, wood fiber, cotton fiber, hemp fiber, etc. The enhancement layer may be woven from warp and weft fibers that are tubular. The enhancement layer may also comprise at least one conductive metal thread, preferably thin copper wire. The copper wire is woven in axial direction on the enhancement layer for antistatic effect.

The inner lining 130 is made of a second polymer that can be dissimilar to the first polymer of the cover layer 110. The second polymer preferably is a polymer with good chemical resistance characteristics, particularly to ingredients of fracturing liquid. Examples of suitable polymers for the inner lining layer are ethylene propylene diene monomer (EPDM) rubber. EPDM has superior chemical stability as compare to TPU, and also has larger temperature range, which may be used at temperature below 40° C. It is easily understood by one skilled in the art, that other rubber or thermoplastic materials, or the like, could also be used in the manufacture of inner lining without departing from the scope of the present invention. An alternative polymer may be thermoplastic elastomer (TPE), including but not limiting to silicone-modified EPDM rubber, fluororubber, thermoplastic polyamides, high density polyethylene, thermoplastic polyester.

The inner lining 130 is also formed into a tube, preferably by an extruding process. Preferably, the thickness of the inner lining 130 will vary between 0.5-4.0 mm, but could also be thicker or thinner. Also, the inner lining 130 has a surface that is capable of bonding to the woven enhancement layer 120 by use of moderate heat. In certain embodiments, a second adhesive layer (not shown) is applied to one surface of the tubular inner lining 130, which is bonded to the enhancement layer 120. The second adhesive layer typically has a thickness of 0.10-0.35 mm, but could also be thicker or thinner.

In order for the hose to perform properly, the diameter of each layer is such that the different layers fit tightly within one another, and then bond by applying moderate heat and pressure.

The preferred method for the application of the first adhesive layer is via co-extrusion of the cover layer 110 and the first adhesive layer. The preferred method for the application of the second adhesive layer is also via co-extrusion of the inner lining 130 and the second adhesive layer.

Figure 2:
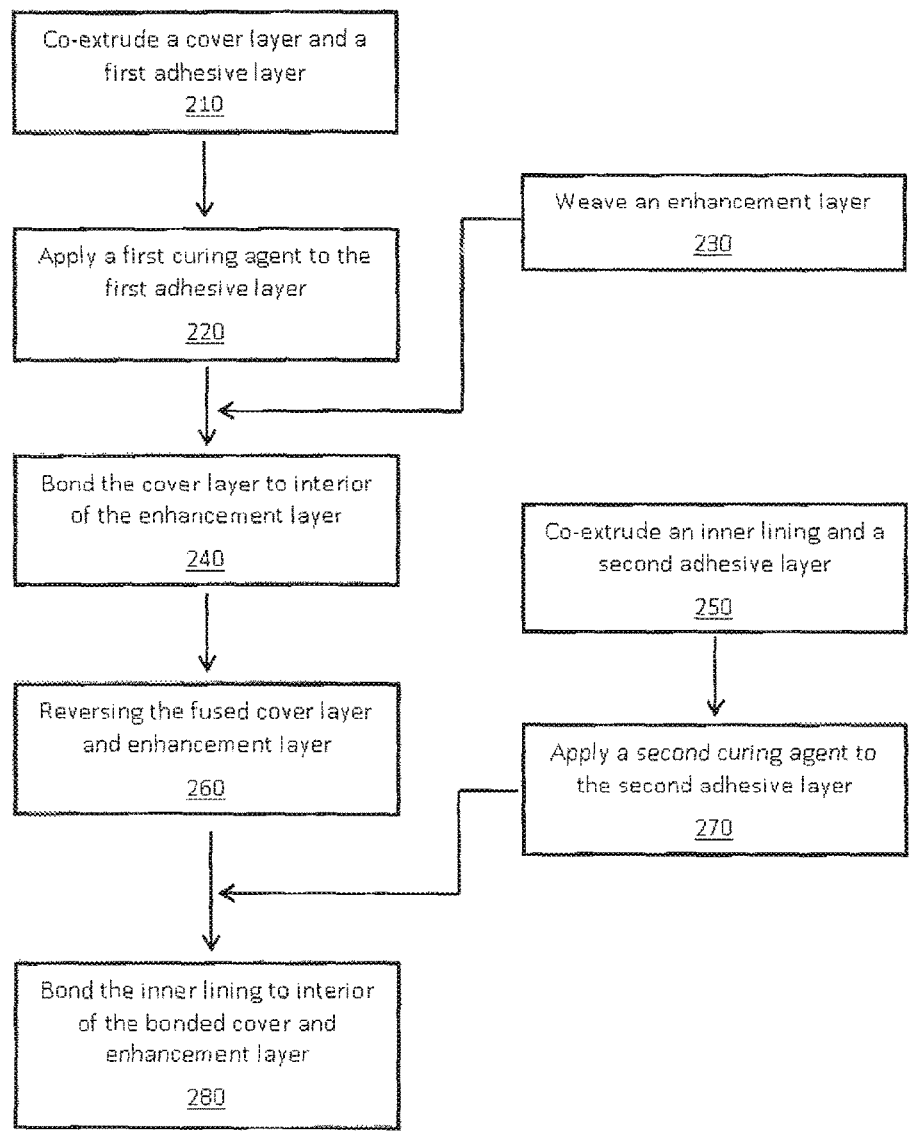
FIG. 2 is a flow chart illustrating an embodiment of the manufacturing method of the multi-layer hose of the present invention.

An exemplary flow chart illustrating an embodiment of the manufacturing method of the multi-layer hose of the present invention is shown in FIG. 2. The manufacturing method typically comprises the following steps.

(1) Co-extrusion of a cover layer bearing a first adhesive layer 210, preferably extruding the cover layer granules and adhesive granules by two extruders into a co-extrusion die, and subjecting a coextruded laminate layer to cooling, pulling and squashing to give a flat tube, i.e., the cover layer bearing the adhesive layer, where the adhesive layer had a typical thickness of 0.10-0.35 mm and the cover layer had a typical thickness of 0.5-4.0 mm;

(2) Co-extrusion of an inner lining bearing an adhesive layer, preferably extruding the inner lining granules and adhesive granules by two extruders into a co-extrusion die, and subjecting the coextruded laminate layer to cooling, pulling and squashing to give a flat tube, i.e., the inner lining bearing the adhesive layer, where the adhesive layer has a typical thickness of 0.10-0.35 mm and the inner lining has a typical thickness of 0.5-4.0 mm;

(3) Applying curing agent to first and second adhesive layers from Step (1) and Step (2) 220 270, preferably, by immersing it into a solution for physical permeation prior to use, where the solution is formulated from a curing agent and solvent at a ratio of 10-30:70-90;

(4) Forming an enhancement layer 230. Weaving a tubular enhancement layer, typically according to product design specifications;

(5) Bonding the cover layer and the enhancement layer, preferably by pulling the surface-treated cover layer with the adhesive layer from Step (3) into the tubular enhancement layer, fixing at both ends, passing through a steam of 0.10-0.35 MPa for 4-10 minutes, prior to cooling with air in place of steam while maintaining pressure to the desired temperature;

(6) Reversing the bond cover layer and enhancement layer of Step (5), whereby the cover layer is on the exterior of the enhancement layer after the reversal;

(7) Bonding the inner lining and the enhancement layer, preferably by pulling the surface-treated inner lining with the adhesive layer from Step (3) into the product from Step (6), fixing at both ends, passing through a steam of 0.10-0.35 MPa for 4-10 minutes, prior to cooling with air in place of steam while maintaining pressure to the desired temperature.

In the method for manufacturing the multi-layer hose, the TPU granules or TPU/PVC blends are used in the cover layer described in Step (1), and the TPU granules or TPU/PVC blends or PVC or PVC/NBR blends are used in the inner lining described in Step (2), where in the TPU/PVC blends, TPU:PVC=100:0-70; in the PVC/NBR, PVC:NBR=100:0-70; and in Step (1) and Step (2), the cover layer and inner lining granules are preferably extruded at temperature of 150-210° C., and the adhesive granules are preferably extruded at temperature of 140-175° C.

In this embodiment, the adhesive granules used may be TPU hot-melt adhesive, e.g., UB410B from Lubrizol Corp. Also in this embodiment, the curing agent may be a material named diphenylmethane diisocyanate (MDI), e.g., BASF M205. The curing agent (including an active NCO group) may be bonded firmly to the terylene filaments which contain hydroxyl groups, nylon fibers, or treated aramid fibers, which contain amino groups as active sites, to form carbamate and urea structures, respectively, by physical permeation and chemical reaction at a certain temperature and pressure.

The reversal of intermediate from Step (5) may be carried out with a number of equipment well known to one skilled in the art. The evagination of a layer by air pressure or liquid pressure via an apparatus was described in the U.S. Pat. No. 8,066,499, issued to Driver et al.

In the method for manufacturing the multi-layer hose, a color concentrate is preferably also added to the cover layer granules and the inner lining granules described in Step (1) and/or Step (2) at 100:(0.5-1.5) mass ratio of the cover layer granules or the inner lining granules to the color concentrate, and then stirred uniformly and dried.

In the method for manufacturing the multi-layer hose, the enhancement layer described in Step (4) is woven from terylene filaments, or nylon filaments, or aramid fibers, or the blends of terylene, or nylon filaments, or aramid fibers.

The method for manufacturing the multi-layer hose may further comprises the step of roll press on the surface after reversal. The step of roll press may be conducted by a specific machine, e.g., a roll press machine. In a typical example, a roll press machine is equipped with two press rolls which together form a press gap and whose axes are situated in a press plane. The press rolls can further comprise a plurality of short needles. When the hose enters through the press gap, the press rolls rotate and press the hose to improve the surface properties such as smoothness and gloss, and remove the gas in the cavities between the neighboring layers of the hose.

Figure 3:
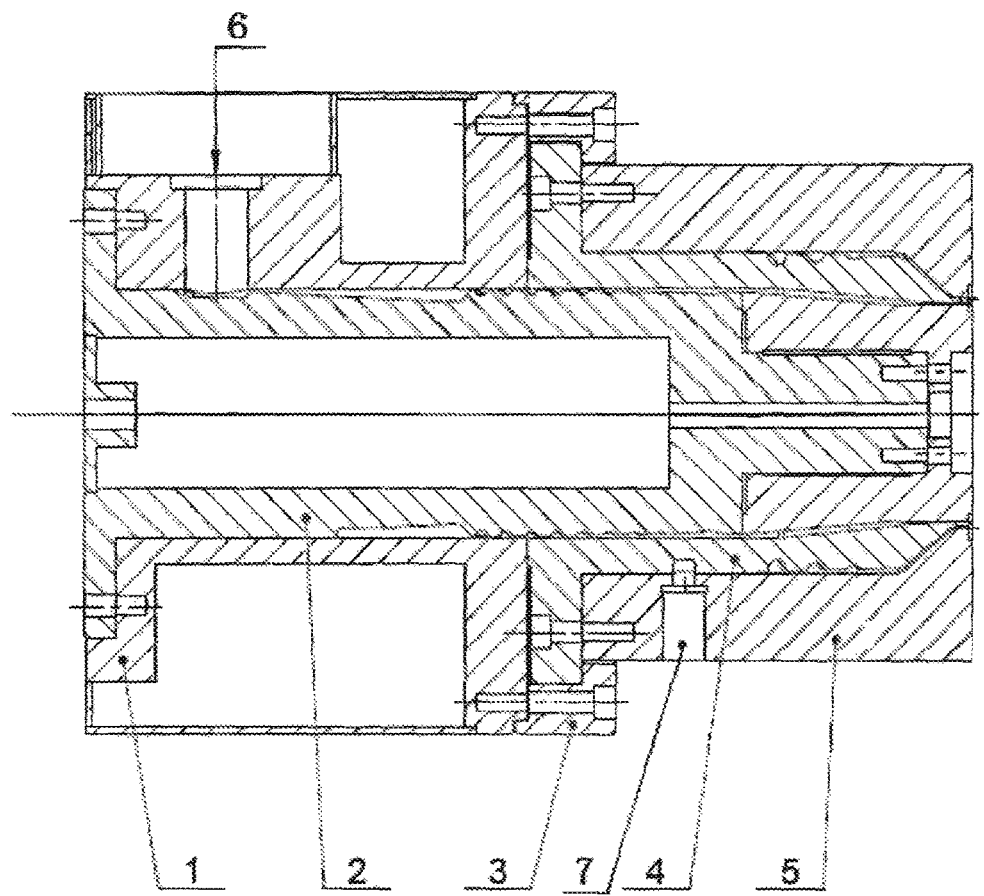
FIG. 3 is a schematic illustration of the structure of the co-extrusion die of the present invention, where, 1: housing, 2: shaft, 3: clamping ring, 4: distributor block, 5: die case, 6: first feed inlet, 7: second feed inlet.

An exemplary co-extrusion die is shown in FIG. 3. A co-extrusion die, including: a housing equipped with a shaft therein; a distributor block, provided below the shaft, in the form of frustum for its lower part, where there is a gap between the shaft and the distributor block, the distributor block is fixedly connected to the housing having a first feed inlet connected to the cover layer or inner lining grain extruder, the first feed inlet penetrates through the housing and is connected fluidly to the gap between the shaft and the distributor block; a die case provided outside the distributor block, where there is a gap between the die case and the distributor block, the die case is fixedly connected to the housing, the die case has a second feed inlet connected to the adhesive extruder, the second feed inlet penetrates through the die case and is connected fluidly to the gap between the die case and the distributor block; and a clamping ring provided between the distributor block and the housing.

The hose provided by the present invention provides at least the following beneficial effects. The hose of the present invention may have high structural integrity, resistant to abrasion, long durability, resistant to high pressure, satisfactory weather- and chemical-resistance, and suitable for various terrain topographies. The hose provided herein lays flat when it is not used, and is convenient for storage and transportation. It can be manufactured in any length while keeping the dimensional uniformity, and furthermore, the hose has very small elongation and therefore has good stability when transporting a medium.

EXEMPLARY EMBODIMENTS

An exemplary embodiment of the present invention is a multi-layer hose having a cover layer of TPU with a thickness of 1.5±0.2 mm, an enhancement layer made of nylon-66 fiber with a thickness of 2.6±0.2 mm, and an inner lining of EPDM with a thickness of 1.4±0.2 mm.

The multi-layer hose exhibits superior structural integrity. Adhesion strength between the TPU layer and the enhancement layer is greater than 80 N/25 mm. Adhesion strength between the EPDM layer and the enhancement layer is also greater than 80 N/25 mm. The exemplary hose is of diameter 255-258 mm, has a longitudinal extension of 4-5% under the operating pressure, rebound of less than 1%, burst pressure greater than 3.8 MPa, detachment strength greater than 80 N/25 mm.

Another exemplary embodiment of the present invention is a multi-layer hose having a cover layer of TPU/PVC blends (mass ratio TPU/PVC=100:50) with a thickness of 1.0±0.2 mm, an enhancement layer made of terylene fiber with a thickness of 2.5±0.2 mm, and an inner lining of EPDM with a thickness of 1.4±0.2 mm.

The multi-layer hose also exhibits superior structural integrity. Adhesion strength between the TPU layer and the enhancement layer is greater than 60 N/25 mm. Adhesion strength between the EPDM layer and the enhancement layer is also greater than 75 N/25 mm. The exemplary hose is of diameter 255-257 mm, has a longitudinal extension of 4% under the operating pressure, rebound of less than 1%, burst pressure greater than 3.8 MPa, detachment strength greater than 70 N/25 mm.

What is claimed is:

1. A method of manufacturing a multi-layer hose, comprising the steps of:
   (1) forming a tubular cover layer and a first adhesive layer from co-extruding a first polymer and a hot-melt adhesive, wherein the first adhesive layer is on an outside surface of the tubular cover layer;
   (2) forming a tubular inner lining and a second adhesive layer from co-extruding a second polymer and a hot-melt adhesive, wherein the first polymer is dissimilar to the second polymer, and the second adhesive layer is on an outside surface of the tubular inner lining;
   (3) weaving a tubular enhancement layer;
   performing the following steps in sequential order:
   (4) bonding the tubular cover layer and the first adhesive layer to the tubular enhancement layer by pulling the tubular cover layer and first adhesive layer inside the tubular enhancement layer, wherein the first adhesive layer is facing the tubular enhancement layer;
   (5) reversing the tubular cover layer and the tubular enhancement layer via a reversal process after the tubular cover layer and the first adhesive layer are bonded to the tubular enhancement layer, wherein the tubular cover layer is on an exterior of the tubular enhancement layer after the reversal process;
   (6) placing the tubular inner lining and the second adhesive layer inside the tubular enhancement layer having the tubular cover layer located on the exterior via the reversal process so that the second adhesive layer is facing the tubular enhancement layer; and
   (7) bonding the tubular inner lining and the second adhesive layer to the tubular enhancement layer.

2. The method of manufacturing a multi-layer hose of claim 1, further comprising the steps of treating the tubular cover layer and first adhesive layer and the tubular inner lining and second adhesive layer with a curing agent after step (2) and before step (3).

3. The method of manufacturing a multi-layer hose of claim 1, wherein the first polymer is selected from the group consisting of thermoplastic polyurethane (TPU), TPU/PVC, or PVC, or PVC/NBR, acrylonitrile butadiene styrene, ethylene vinyl acetate, polyamides, polyimides, natural rubbers, modified natural rubber, synthetic rubbers.

4. The method of manufacturing a multi-layer hose of claim 1, wherein the second polymer is selected from the group consisting of ethylene propylene diene monomer (EPDM) rubber, silicone-modified EPDM rubbers, fluororubbers, high density polyethylene.

5. The method of manufacturing a multi-layer hose of claim 1, wherein the tubular cover layer and the tubular inner lining are extruded at temperature of 150-210° C.

6. The method of manufacturing a multi-layer hose of claim 1, wherein the first and second adhesive layers are extruded at temperature of 140-175° C.

7. The method of manufacturing a multi-layer hose of claim 1, wherein bonding of the tubular cover layer to the tubular enhancement layer is achieved by passing through a steam of 0.10-0.35 MPa for 4-10 minutes.

8. The method of manufacturing a multi-layer hose of claim 1, wherein bonding of the tubular inner lining to the tubular enhancement layer is achieved by passing through a steam of 0.10-0.35 MPa for 4-10 minutes.

* * * * *